United States Patent [19]
Dunstan

[11] 3,863,945
[45] Feb. 4, 1975

[54] WHEEL UNIT FOR ATTACHMENT TO A TRIPOD

[76] Inventor: Diane M. Dunstan, 3312 N. Central, No. 203, Phoenix, Ariz. 85012

[22] Filed: Sept. 4, 1973

[21] Appl. No.: 393,948

[52] U.S. Cl................ 280/35, 280/47.13, 280/79.1
[51] Int. Cl............................................. B62b 1/12
[58] Field of Search........... 280/34 R, 35, 47.13, 64, 280/79.1; 182/16, 20, 21, 127

[56] References Cited
UNITED STATES PATENTS

| | | | |
|---|---|---|---|
| 1,004,550 | 10/1911 | Bertke | 182/21 |
| 1,992,108 | 2/1935 | White | 182/47.13 R X |
| 2,919,138 | 12/1959 | Brower | 280/47.13 R X |
| 2,922,487 | 1/1960 | Reitknecht | 182/16 |
| 3,104,889 | 9/1963 | Branch | 182/20 X |
| 3,159,410 | 12/1964 | Raymond | 280/35 |

FOREIGN PATENTS OR APPLICATIONS

| | | | |
|---|---|---|---|
| 643,905 | 9/1950 | Great Britain | 280/35 |

*Primary Examiner*—David Schonberg
*Assistant Examiner*—Michael J. Forman
*Attorney, Agent, or Firm*—Brown & Martin

[57] ABSTRACT

A wheel unit for attachment to a tripod, such as a camera tripod. Wheels are attached to two legs of the tripod and are fully adjustable to the specific tripod, the wheels being positioned to provide rolling support for the tripod with a camera and any accessories remaining in place. A carrier may be used in conjunction with the wheel unit to hold an accessory bag or case.

4 Claims, 4 Drawing Figures

PATENTED FEB 4 1975

3,863,945

WHEEL UNIT FOR ATTACHMENT TO A TRIPOD

BACKGROUND OF THE INVENTION

In photographic work, a tripod is often used to provide steady support for a camera, particularly when using a long focal length lens, or for exposure times which necessitate a firm support. A typical rigid tripod, camera, accessory bag and other apparatus can be very cumbersome when moving from one location to another, and it is often necessary to dismantle some of the apparatus to simplify transportation. Tripods and other supports have been developed to incorporate wheels, but these are invariably special cart type designs which are complex and expensive.

A great many tripods are in present use and most photographers would not want to incur the expense of a completely new tripod for the convenience of wheels. It would therefore be a great advantage to be able to adapt existing tripods to wheeled support at minimum cost.

SUMMARY OF THE INVENTION

The wheel unit described herein is adaptable to almost all existing tripods without modification. A pair of wheels mounted on individual brackets are attached to two legs of the tripod, the brackets being adjustable to the legs and to the angle of separation of the legs when the tripod is set up. A telescopic rod interconnects the two wheels and has locking means for holding the wheels, and the two tripod legs, in spaced apart position. The wheel unit does not interfere with normal use of the tripod and its telescopically adjustable legs.

For transportation the telescopic legs of the tripod are collapsed, but the two wheeled legs remain spread apart to provide a wide stable wheel base. The existing handle of the tripod head is used as a towing or pushing handle and the tripod is tilted on to the wheels, the third leg folding by itself into normal collapsed position.

To extend the versatility of the wheeled tripod, a carrier may be attached to the wheel unit to hold a conventional accessory bag. Alternatively the bag can be attached to the two wheeled legs of the tripod, since the legs remain in the spread apart position in use. The camera and any other apparatus on the tripod can thus be left in set up position and the tripod rolled from one location to another by one hand, in the manner of a cart.

The primary object of this invention is to provide a new and improved wheel unit for attachement to a tripod.

Another object of this invention is to provide a new and improved wheel unit which is adjustable to fit most existing tripods.

A further object of this invention is to provide a new and improved wheel unit which effectively converts a conventional tripod to a cart, for carrying a camera or other apparatus in set up position.

Other objects and many advantages of this invention will become more apparent upon a reading of the following detailed description and an examination of the drawing, wherein like reference numerals designate like parts throughout and in which.

DESCRIPTION OF THE PREFERRED EMBODIMENTS

Figures 1, 2, 3, 4:
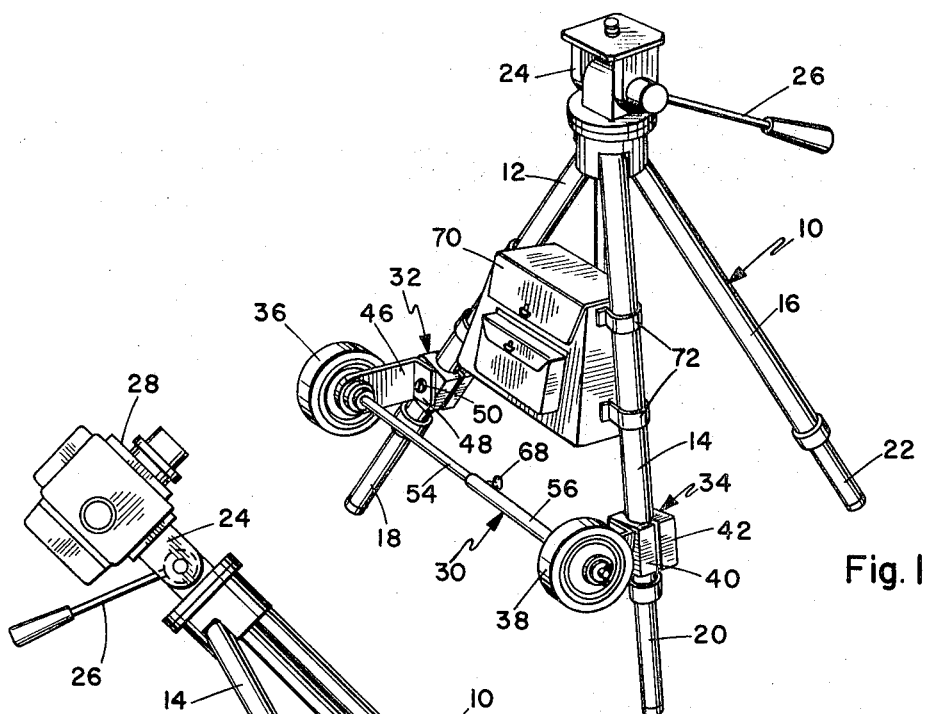
FIG. 1 is a perspective view of a typical tripod with the wheel unit and an accessory bag attached.
FIG. 2 is a side elevation view of the tripod in transport configuration.
FIG. 3 is an enlarged sectional view taken on line 3—3 of FIg. 2.
FIG. 4 is a perspective view of a portion of the tripod with a carrier rack attached.

The tripod 10 is typical and has legs 12, 14 and 16 with telescopic extensions 18, 20 and 22, respectively. Some tripods have double extensions and many different adjustment and locking means are used. On top of the tripod is an adjustable head 24 of conventional type, with a control and locking handle 26. A camera 28 is mounted on the head 24, as in FIG. 2.

Wheel unit 30 comprises a pair of bracket assemblies 32 and 34 carrying wheels 36 and 38, the two assemblies being essentially the same for ease of manufacture and corresponding elements being similarly numbered. Bracket assembly 32 includes a pair of clamp blocks 40 and 42 channelled to fit around leg 12, and secured in place by screws 44. Wheel 36 is mounted on the arm 46 of a substantially L-shaped member, the end flange 48 of which is secured to clamp block 40 by a screw 50. The axis of screw 50 is radial to the axis of leg 12, so that the wheel can be adjusted to vertical alignment regardless of the angle of the leg. As illustrated, the wheel is rotatable on a bushing 52 fixed through arm 46.

The wheels are interconnected by an axle 54 which is telescopically slidable in one end of a tube 56, the other end of the tube having a stub axle 58 fixed therein by a pin 60. Axle 54 has a stop ring 62 which bears against the inner end of bushing 52 through wheel 36, the outer end of the axle being retained by a washer 64 and cotter pin 66. Tube 56 acts as a stop against bushing 52 through wheel 38, the outer end of stub axle 58 being retained by a further washer 64 and cotter pin 66. Axle 54 is secured in tube 56 by a lock screw 68 to hold the spacing between the wheels at the normal spread of the tripod legs. It should be noted that the wheel mounting and telescopic axle configuration are merely exemplary, and may vary to suit available types of wheels and bearings.

The bracket assemblies are secured near the lower ends of the tripod legs so that, with the leg extensions retracted, the tripod can be tilted slightly to ride on the wheels with the legs clear of the ground, as in FIG. 2. Handle 26 provides a convenient handle for pushing or pulling the tripod in the manner of a small cart. The locked telescopic axle acts as a spacer holds the wheels in alignment with a wide stable wheel base and the third leg 16 folds against the center of the tripod under its own weight in the transport position. By removing cotter pins 66 and collapsing and removing the axle, the tripod can be closed for storage.

To make the apparatus more versatile, means is provided for carrying an accessory bag commonly used by photographers. In FIGS. 1 and 2, the bag 70 is dimensioned to fit between legs 12 and 14 and is secured to the legs by suitable straps 72, or similar means. For conventional accessory bags too large to fit between the tripod legs, the arrangement of FIG. 4 may be used. A platform or rack 74, of wire or other material, is attached to the axle by spring clips 76, or the like. The back portion 78 of rack 74 is secured to the legs by straps 80. Any reasonable sized accessory bag can then be held on the rack by its own straps or by suitable retaining means.

In use the wheel unit does not interfere with normal operation of the camera and equipment and, once set up does not require any further adjustment. While the wheel unit is illustrated in use on a camera tripod, it will be obvious that it is equally adaptable to other tripods, such as for a telescope or for surveying instruments.

Having described my invention, I now claim:

1. A wheel unit for attachment to two legs of a tripod, comprising:
    a pair of brackets each having a clamp portion with means for clamping on one of the tripod legs;
    an arm extending from each clamp portion, each arm being pivotally adjustable on the clamp portion about an axis substantially radial to the longitudinal axis of the respective tripod leg;
    each said arm having a wheel rotatably mounted thereon;
    and spacing means interconnecting said brackets for holding the brackets and the two tripod legs in spaced apart position.

2. A wheel unit according to claim 1, wherein said spacing means is an axle extending between and attached to said wheels.

3. A wheel unit according to claim 2, wherein said axle is telescopically adjustable.

4. A wheel unit according to claim 1, and including a rack mounted on the wheel unit for supporting accessory equipment.

* * * * *